United States Patent [19]
Kajiwara et al.

[11] Patent Number: 6,061,474
[45] Date of Patent: *May 9, 2000

[54] IMAGE PROCESSING APPARATUS AND METHOD

[75] Inventors: Hiroshi Kajiwara, Inagi; Tadashi Yoshida, Ichikawa; Yasuji Hirabayashi, Kawasaki, all of Japan

[73] Assignee: CanonKabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/668,635

[22] Filed: Jun. 21, 1996

[30] Foreign Application Priority Data

Jun. 22, 1995 [JP] Japan ................................... 7-156146
Jun. 22, 1995 [JP] Japan ................................... 7-156147
Jul. 14, 1995 [JP] Japan ................................... 7-178708

[51] Int. Cl.$^7$ .............................. G06K 9/36; H04N 7/12
[52] U.S. Cl. ......................... 382/238; 382/239; 382/240; 348/411
[58] Field of Search ..................................... 382/234, 238, 382/239, 260, 282; 348/394, 390, 397, 400, 409, 411, 261.2, 430; 341/55, 107; 358/430; 375/250, 252, 241

[56] References Cited

U.S. PATENT DOCUMENTS

| | | | |
|---|---|---|---|
| 4,369,463 | 1/1983 | Anastassiou et al. ................... | 348/411 |
| 5,020,121 | 5/1991 | Rosenberg .............................. | 382/238 |
| 5,122,873 | 6/1992 | Golin ..................................... | 382/240 |

FOREIGN PATENT DOCUMENTS

| | | | |
|---|---|---|---|
| 0103733A1 | 3/1984 | European Pat. Off. ......... | H04N 1/41 |
| 0296608A2 | 12/1988 | European Pat. Off. ....... | H04N 7/133 |
| 0309669A2 | 4/1989 | European Pat. Off. ......... | H04N 7/13 |
| 0523939A2 | 1/1993 | European Pat. Off. ......... | H04N 1/41 |
| 0547826A1 | 6/1993 | European Pat. Off. ......... | H03M 3/04 |

OTHER PUBLICATIONS

I.J. Dukhovich, "A DPCM System Based on a Composite Image Model", 8089 IEEE Transactions on Communications, vol. Com–31 (1983) Aug., No. 8, pp. 1003–1017, New York, USA.

C.H. Hsieh, "Adaptive Predictive Image Coding Using Local Characteritics", 8049 IEE Proceedings–I, 136(1989) Dec. No. 6, Part I.

Nobutaka Kuroki, "Lossless Image Compression by Two–Dimensional Linear Prediction with Variable Coefficients", IEICE Trans. Fundamentals, vol. E75–A, No. 7, Jul. 1992.

Charles W. Rutlege, "Variable Block Vector DPCM: Vector Predictive Coding of Color Images", Proceedings of the ICC–87, vol. 1, Jun 7–10, 1987, pp. 130–135.

*Primary Examiner*—Thomas D. Lee
*Assistant Examiner*—Wenpeng Chen
*Attorney, Agent, or Firm*—Fitzpatrick, Cella, Harper & Scinto

[57] ABSTRACT

An encoding error by the encoding and the decoding of an image is controlled within a predetermined range by an image processing apparatus which includes an input unit for inputting image data, a prediction unit for predicting pixel values indicated by the image data, a generation unit for generating pixel values derived by converting the pixel values of the image data within a range of ±e based on the prediction result by said prediction unit and an encoding unit for encoding parameters relating to the pixel values generated by said generation unit based on the prediction result by said prediction unit. An image having a gradient in the values of block pixels is encoded at a high efficiency by an image processing apparatus which includes a division unit for dividing an image into block pixels to be encoded, a generation unit for generating parameters defining a plane based on values of first block pixels and values indicating positions of the block pixels to be encoded and a plane encoding unit for encoding difference values between the values of the block pixels indicated by the plane defined by the parameters and the values of the encoded block pixels.

19 Claims, 16 Drawing Sheets

| NO. | ENCODE METHOD |
|---|---|
| # 0 | A + B - C |
| # 1 | B |
| # 2 | A |
| # 3 | B + ( A - C ) / 2 |
| # 4 | A + ( B - C ) / 2 |
| # 5 | ( A + B + C ) / 3 |
| # 6 | PLANE APPROXIMATION MODE |
| # 7 | UNIFORM MODE |
| # 8 | BINARY MODE |

HUFFMAN TABLE BEING COMMON IN EACH BLOCK SIZE

FIG. 3

☆ #0 TO #5     PREDICTION ENCODE

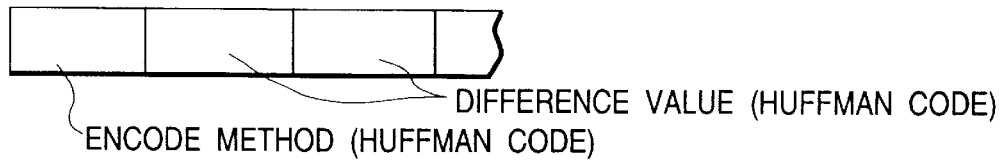

ENCODE METHOD (HUFFMAN CODE) / DIFFERENCE VALUE (HUFFMAN CODE)

☆ #6     PLANE ENCODE (1) $|a|, |b| \leq$ Th (CONSTANT VALUE), DIFFERENCE PRESENT

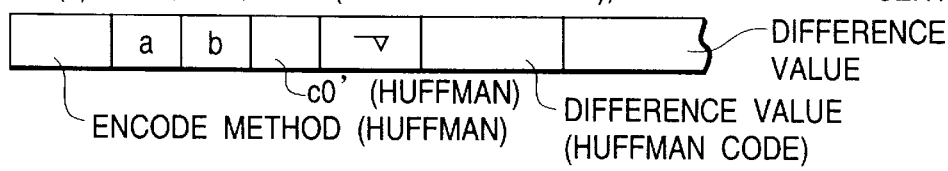

ENCODE METHOD (HUFFMAN) / c0' (HUFFMAN) / DIFFERENCE VALUE (HUFFMAN CODE) / DIFFERENCE VALUE (2) $|a|, |b| \leq$ Th (CONSTANT VALUE), NO DIFFERENCE

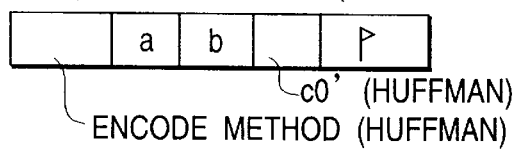

ENCODE METHOD (HUFFMAN) / c0' (HUFFMAN)

(3) $|a|, |b| >$ Th (CONSTANT VALUE), DIFFERENCE PRESENT

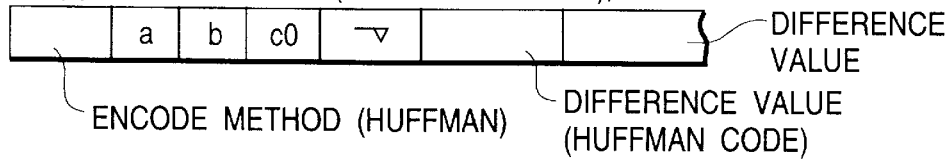

ENCODE METHOD (HUFFMAN) / DIFFERENCE VALUE (HUFFMAN CODE) / DIFFERENCE VALUE (4) $|a|, |b| >$ Th (CONSTANT VALUE), NO DIFFERENCE

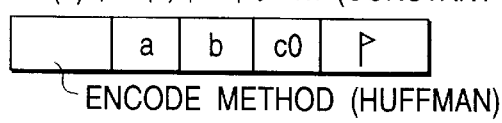

ENCODE METHOD (HUFFMAN)

☆ #7     PLANE ENCODE (FLAT)

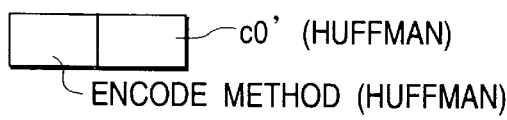

c0' (HUFFMAN) / ENCODE METHOD (HUFFMAN)

☆ #8     BINARY RUN LENGTH ENCODE     EOB CODE (HUFFMAN)

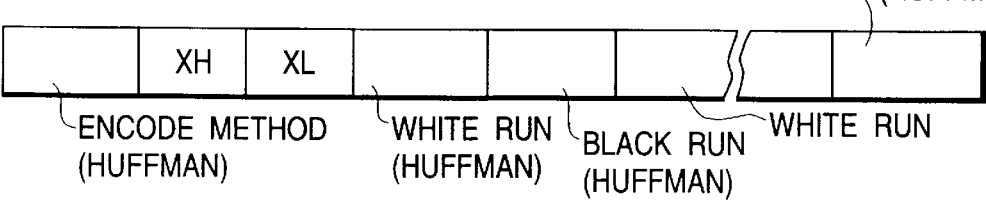

ENCODE METHOD (HUFFMAN) / WHITE RUN (HUFFMAN) / BLACK RUN (HUFFMAN) / WHITE RUN

FIG. 4

| c0 DIFFERENCE (c0') | HUFFMAN CODE |
|---|---|
| 0 | 0 |
| -1, 1 | 100 S |
| -2, 2 | 101 S |
| -3, 3 | 110 S |
| -4, 4 | 111000 S |
| -5, 5 | 111001 S |
| -6, 6 | 111010 S |
| -7, 7 | 111011 S |
| -8, 8 | 111100 S |
| -9, 9 | 111101 S |
| -10, 10 | 111110 S |
| -11, 11 | 11111100 S |
| -12, 12 | 11111101 S |
| -13, 13 | 11111110 S |
| ESC | 11111111 |

HUFFMAN CODE TABLE OF c0'

SQUARE BLOCK

PROC SUBJECT BLOCK    SUB BLOCK

ENCODE AMOUNT COMPARISON

IMAGE PROCESSING APPARATUS AND METHOD

BACKGROUND OF THE INVENTION

1. Field of the Invention

The present invention relates to image processing apparatus and method for encoding an image.

2. Related Background Art

An image encoding method is classified into two major classes, an information preservation type encoding method in which an original image is completely restored when decoded and an information-non-reservation type encoding in which an error from the original image is included.

As the information preservation type encoding method, a DPCM encoding method has been known. In a common DPCM encoding, a predicted value of a pixel to be encoded is calculated based on encoded pixels around the pixel to be encoded, that is, a left pixel (A), an upper pixel (B) and a lift diagonal pixel (C) by using a formula (A+B−C), for example, and a difference between the result and the value of the pixel to be encoded is encoded.

In the information non-reservation type encoding method, it is not possible to completely restore the original image but it allows a high compression ratio. Therefore, when a large amount of image data is handled or an error is not critical, the information non-reservation type encoding system is frequently used. A JPEG baseline system is one of the information non-reservation type encoding methods.

In prior art image compression, a block code has been frequently used. In a conversion encoding which includes many irrevocable encoding, a block is a unit of encoding.

The concept of predicting a pixel value by a plane has been adopted in a commonly used DPCM. For example, for a pixel under consideration, a predicted value is calculated by (a+b−c) where a is a left adjacent pixel value, b is an upper pixel value and c is a left upper pixel value.

In general, since most portions of the image are formed by simple brilliance gradients, the effect of using the above prediction is great.

In the prior art prediction encoding system, the value of pixel to be encoded is predicted from values of surrounding pixels and a difference between the predicted value and the value of the pixel under consideration is entropy-coded and transmitted. In this system, the amount of codes generated is influenced by the prediction system and an optimum prediction system differed from area to area. Accordingly, in order to efficiently apply this system, it is common to use a method in which the image is divided into blocks and an optimal prediction system is selected for each block and a code is generated by adding information for specifying the prediction system.

The method for selecting the prediction system for each block is effective when the optimal prediction method differs from block to block but the transmission of the added information is not effective when the prediction system is uniform in a large area such as an image background area.

In the prior art image encoding, since the amount of encoded data is simply controlled, it is not possible to encode an image in which a certain degree of error between an actual pixel value of the image to be encoded and a pixel value of the encoded and decoded version of the original image is permitted (an allowable error range), at a high efficiency and within a predetermined error of the pixel value.

A digital image which is actually handled is obtained by reading a printed document or a silver halide photograph by an image scanner or a CCD sensor, and in many cases, random noises are included over an entire area of the image. From experience, in an 8-bit tone brilliance data, random noise having a maximum amplitude of 3 is included. When the prediction is made based on the prior art method of a+b−c, a noise which has a larger dispersion than a dispersion value of the noise is included in the predicted value and hence the efficiency of the encoding is not enhanced.

SUMMARY OF THE INVENTION

In order to solve the above problems, it is an object of the present invention to encode image data at a high compression ratio while controlling an error of a pixel value.

In order to achieve the above object, in accordance with a preferred embodiment of the present invention, there is provided an image processing apparatus comprising input means for inputting image data, prediction means for predicting pixel values indicated by the image data; generation means for generating pixel values derived by converting the pixel values of the image data within a range of ±e based on the prediction result by the prediction means and encoding means for encoding parameters relating to the pixel values generated by the generation means based on the prediction result by the prediction means.

It is another object of the present invention to encode multi-value data at a high compression ratio while controlling an error of a pixel value.

It is other object of the present invention to provide an encoding method which eliminates the problems in the prior art and allows encoding of data block by block, particularly a high efficiency reversible encoding of gradient image data.

In order to achieve the above object, in accordance with a preferred embodiment of the present invention, there is provided an image processing apparatus comprising division means for dividing an image into block pixels to be encoded, generation means for generating parameters defining a plane based on values of first block pixels and values indicating positions of the block pixels to be encoded and plane encoding means for encoding difference values between the values of the block pixels indicated by the plane defined by the parameters and the values of the encoded block pixels.

Other objects and features of the present invention will be apparent from the following description of the preferred embodiments and the accompanying drawings.

BRIEF DESCRIPTION OF THE DRAWINGS

FIG. 3 shows a portion of image data in the encoded data;

FIG. 4 illustrates a Huffman table to encode c0';

DETAILED DESCRIPTION OF THE PREFERRED EMBODIMENTS

First Embodiment

Figure 1:
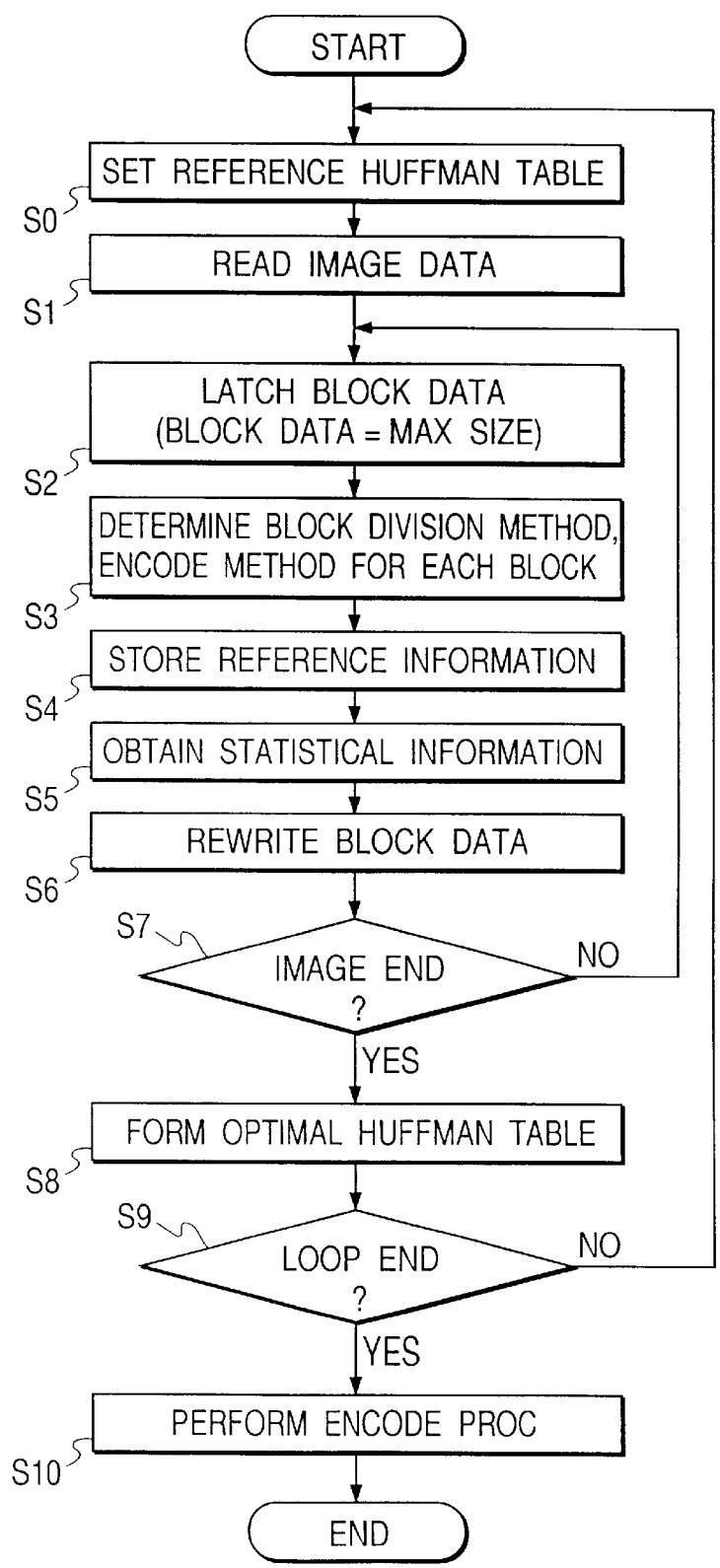
FIG. 1 shows a flow of a process in a first form of implementation of the present invention.

FIG. 1 shows a flow of a process of a first embodiment of the present invention. In FIG. 1, S0 denotes a step to set a reference Huffman table to be described later, S1 denotes a step to read image data, S2 denotes a step to read block data from the image data at a maximum block size (16×16 pixels in the present embodiment), S3 denotes a step to determine a block division method and an encoding method, S4 denotes a step to store the block division method and the encoding method determined in the step S3 as reference information, S5 denotes a step to calculate statistics of frequency of occurrence of difference value (prediction error) to be described later which is outputted based on the reference information, S6 denotes a step to update the block data read in the step S2 to virtual block data to be described later, S7 denotes a step to determine an end point of an image, S8 denotes a step to generate an optimal Huffman table based on the difference value statistics calculated in the step S5, S9 denotes a step to determine a loop end and S10 denotes a step to encode the entire image based on the reference information.

The present embodiment is now briefly explained. The encoding in the present embodiment is not a non-reversible encoding but an encoding method in which an error between a pixel value of an actual image and a pixel value of an encoded image is admitted within a range of ±e at maximum. This is referred to as a near lossless encoding.

It is assumed here that a maximum size of block to be encoded is 16×16 pixels and the encoding is performed at one of 16×16 pixels, 8×8 pixels and 4×4 pixels. For the encoding method for each block, six types of prediction encoding methods (#0 to #5), two types of plane encoding methods (#6 and #7) and a run length encoding method (#8) which may be used only when the block is represented in binary form may be selected (see FIGS. 2A and 2B).

The nine types of encoding methods used for the encoding the block are briefly explained. FIG. 3 shows formats of code data by the respective encoding methods.

Figures 2A, 2B:
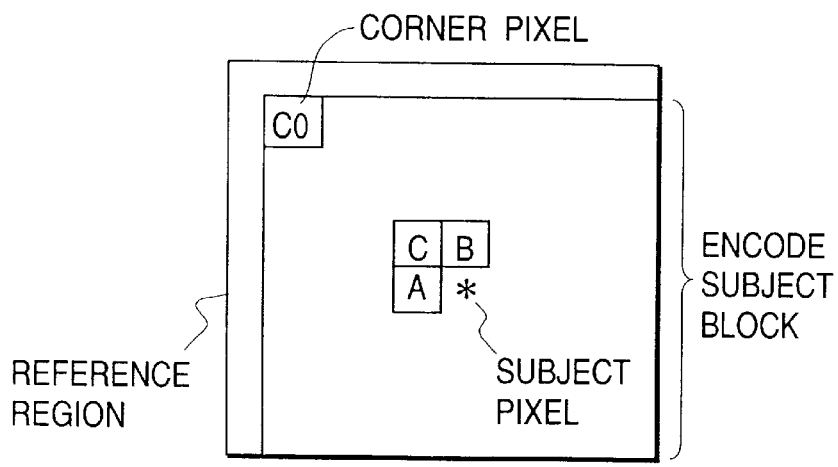
FIGS. 2A and 2B show types of an encoding method and a positional relation of pixels.

The #0 to #5 are for the prediction encoding method in which the predicted value is calculated using surrounding pixels A, B and C shown in FIG. 2A by the formulas of A+B−C, B, A, B+(A−C)/2, A+(B−C)/2, (A+B+C)/3, and a difference between the pixel under consideration and the predicted value is Huffman-encoded. The Huffman table is prepared for each block size and it is encoded by using a separate Huffman table for each block size.

The #6 and #7 are for the plane encoding method. In the #6, a plane which approximates a pixel value of the block is determined by $P(x, y)=ax+by+c0$, where $c0$ is a left upper corner pixel value in the block, and the values of a, b and $c0$ and a difference between the approximate plane and the pixel value in the block are Huffman-encoded.

If a and b are below a predetermined level, a difference $c0'$ from the previously appeared $c0$ is Huffman-encoded for $c0$, and if they are above the predetermined level, the $c0$ value itself is encoded. A flag is inserted after a, b and $c0$ so that the difference data is not added when all of the reference values in the block are zero.

The #7 is used when all pixel values in the block are equal, that is, when it is a plane of $a=b=c0$, and the $c0'$ described above is Huffman-encoded. FIG. 4 shows a Huffman table which is used when the $c0'$ is encoded in the #6 and #7. In FIG. 4, S denotes a sign bit which is 0 or 1 depending on the sign of the difference value $c0$. When the $c0$ is no smaller than 14 or no larger than −14, the difference value is not used and the value of $c0$ is added after the ESC code.

The #8 is for the run length encoding method and it is used only when there are only two pixel values in the block. For example, assuming that a higher brilliance pixel represent white and a lower brilliance pixel represents black, the pixels in the block are scanned in the order shown in FIG. 5, converted to a run length code and it is encoded. For the encoding, predetermined white (high brilliance) run and black (low brilliance) run Huffman table are used and the last run in the block is substituted by the EOB code.

Referring to FIG. 1, a flow of process in the present embodiment is now explained in detail.

In the step S0, the reference Huffman table to be used in encoding the block is set. A Huffman table prepared based on statistical information of predicted errors generated by prediction encoding determined for a plurality of images or by other method is read and a 16×16 pixel prediction coding Huffman table, a 8×8 pixel prediction encoding Huffman table, a 4×4 pixel prediction encoding Huffman table and a plane encoding Huffman table are set.

Four counters to be used when those Huffman tables are newly prepared in the step S8, that is, a 16×16 prediction encoding counter, a 8×8 pixel prediction encoding counter, a 4×4 pixel prediction encoding counter and a plane encoding counter are all initialized to zero.

A Huffman table for Huffman-encoding the information indicating the encoding method (#1 to #8) is prepared for each block size, an encoding counter to be used in newly preparing the Huffman tables is provided and it is also initialized to zero.

In the step S1, the image data to be encoded is read onto an encoding memory.

In the step S2, the block data (maximum block size 16×16 pixels) are sequentially read from the image to be encoded. The upper and left lines of the read block are also read as reference areas for the prediction encoding.

In the step S3, for the maximum size block (16×16 pixels) read in the step S1, the block division method to further dividing the block to sub-block (blocks to be encoded) appropriate for the encoding and the encoding method (#0 to #8) appropriate for the each block to be encoded are determined and the pixel values in the maximum block are updated within an error of ±e from the actual pixel values. In this manner, the encoding can be performed with a small difference value (prediction error). By updating the pixel value within the range of ±e so that the difference values have only several values, the amount of information of the difference values can be reduced. The process of the step S3 is described below in detail.

The routine of the step S3 has a reversible structure and a total amount of codes when the maximum block or a cubic block derived by dividing the maximum block several times (which is refereed to as the block to be processed and the size thereof differs depending on the flow of process) is sub-divided (into four blocks) is compared with an amount of codes when such division is not made to determine whether the block is to be divided or not (see FIG. 6), and the reference information including the block division information and the encoding method as well as the amount of codes when the block selected by the reference information is encoded are outputted.

Figure 7:
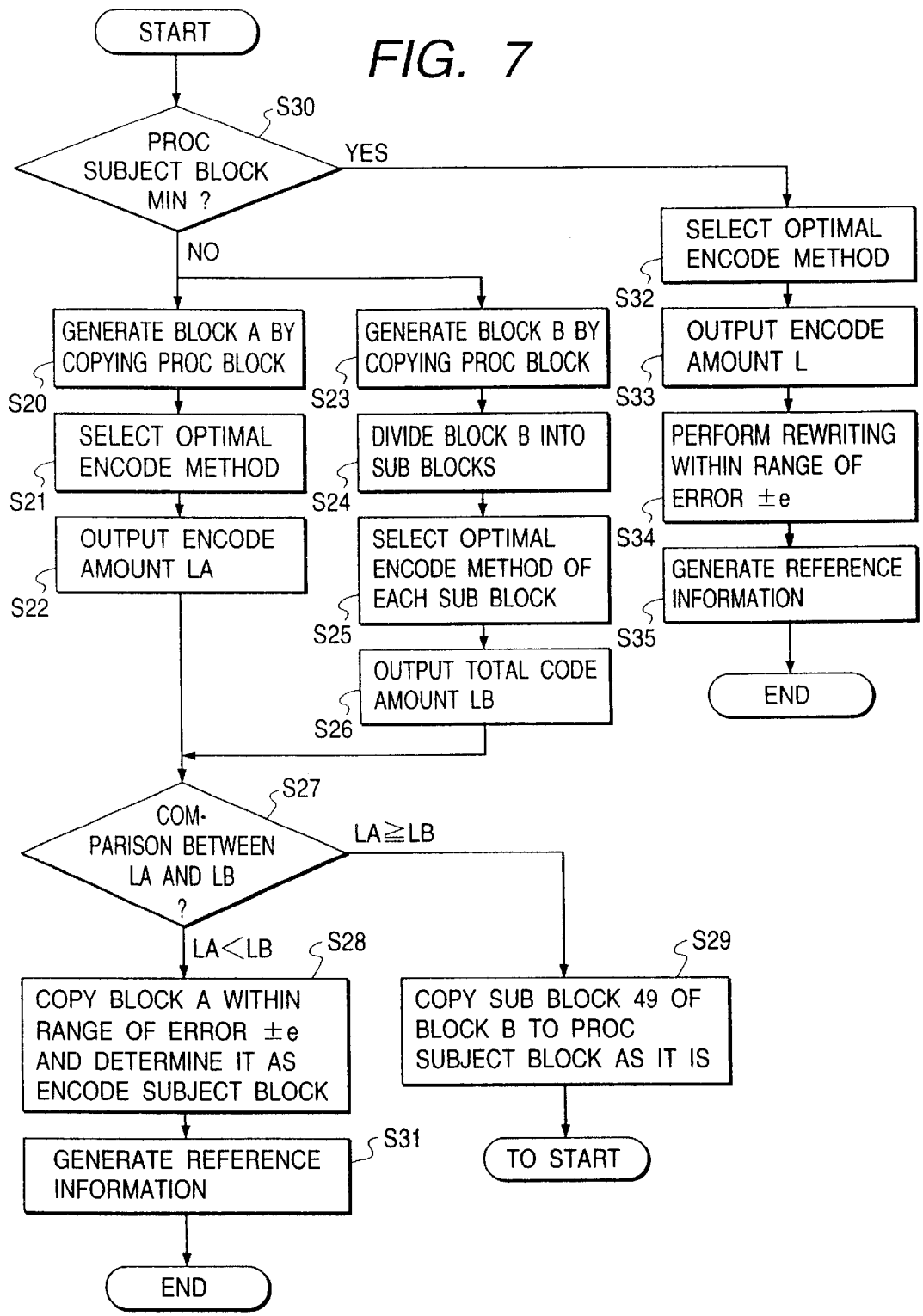
FIG. 7 shows a flow of an S3 process.

FIG. 7 shows a detailed flow of the iterative process used when the encoding method of the maximum block (the block to be processed) and the division method are selected in the step S3.

In FIG. 7, S30 denotes a step to determine the size of the block to be processed. If the block to be processed is the minimum block size (4×4 pixels), the process proceeds to S32, other wise the process proceeds to S20 and S23.

S20 denotes a step to copy the block to be processed to generate a block A. The block to be processed is copied to the block A in the memory area for the iterative process. S21 denotes a step to select the optimal encoding method to minimize the amount of codes LA when the block A is encoded. Detail of the selection method will be described later.

S22 denotes a step to output the amount of codes LA generated when the encoding method selected in S21 is used.

S23 denotes a step to copy the block to be processed to generate a block B. S24 denotes a step to divide the block B into four sub-blocks and S25 denotes a step to select an optimal encoding method for each sub-block as is done in the step S21.

S26 denotes a step to output the total amount of codes which is a sum of amounts of codes when the four sub-blocks are encoded by using the encoding methods selected in the step S25.

In S27, the LA outputted in the step S22 is compare with the LB outputted in the step S29 and If LA<LB, the process proceeds to S28, and if LA≧LB, the process proceeds to S29.

S28 denotes a step to determine the size of the block to be processed in the block A as the size of the block to be processed, and the iterative process to determine the block division method for the range of the block to be processed is terminated. In S28 of the iterative process, the block A, that is, the block to be encoded is updated to the pixel values (within the error range of ±e) of a virtual block to be described later generated in selecting the encoding method in the step S21. The process proceeds to S31 to generate the block division information and the encoding method selected in the step S21 and the amount of codes LA as the reference information.

S29 denotes a step to copy th e block B comprising four sub-blocks to the range of the block to be processed use d at the beginning of the iterative process. The four sub-blocks are substituted by the blocks to be processed and the iterative process to determine the block division method is iterated from the beginning.

In S32, an optimal encoding method of the block to be processed having the minimum block size is selected. In S33, the amount of codes L is outputted. In S34, the block to be processed is updated by the pixel values of the virtual block to be generated later which is generated in the step S32. In S35, the optimal encoding method and the amount of codes L for the block are generated.

So far, the flow of the iterative process used when the encoding method of the maximum block (or the block to be processed) and the block division method are selected in the step S3 has been described.

The selection of the optimal encoding method in the steps S21, S25 and S32 is now explained in detail.

Figure 8:
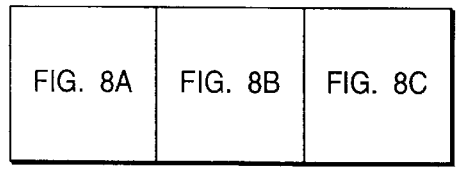
FIG. 8 which is composed of FIGS. 8A to 8C shows a flow of S21, S25 and S32 processes.
Figure 8A:
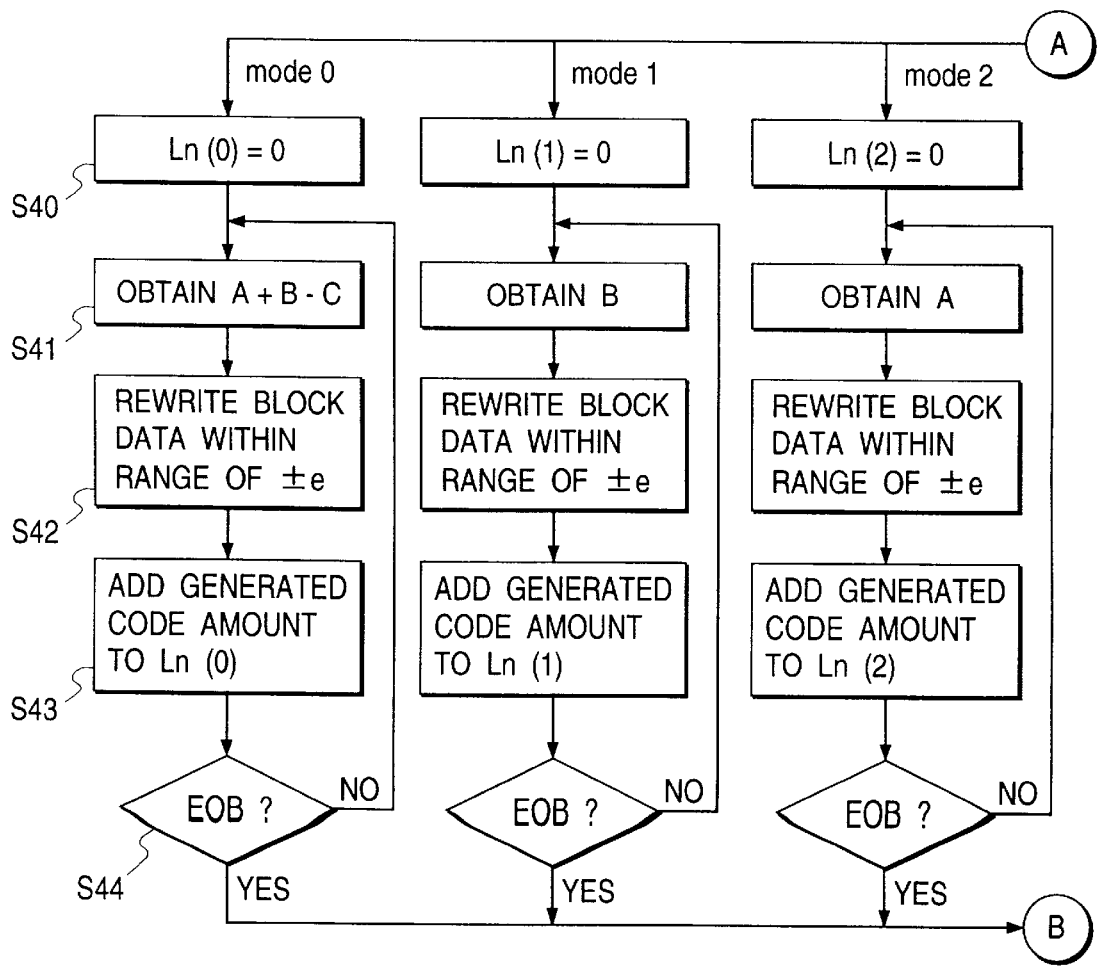
Figure 8B:
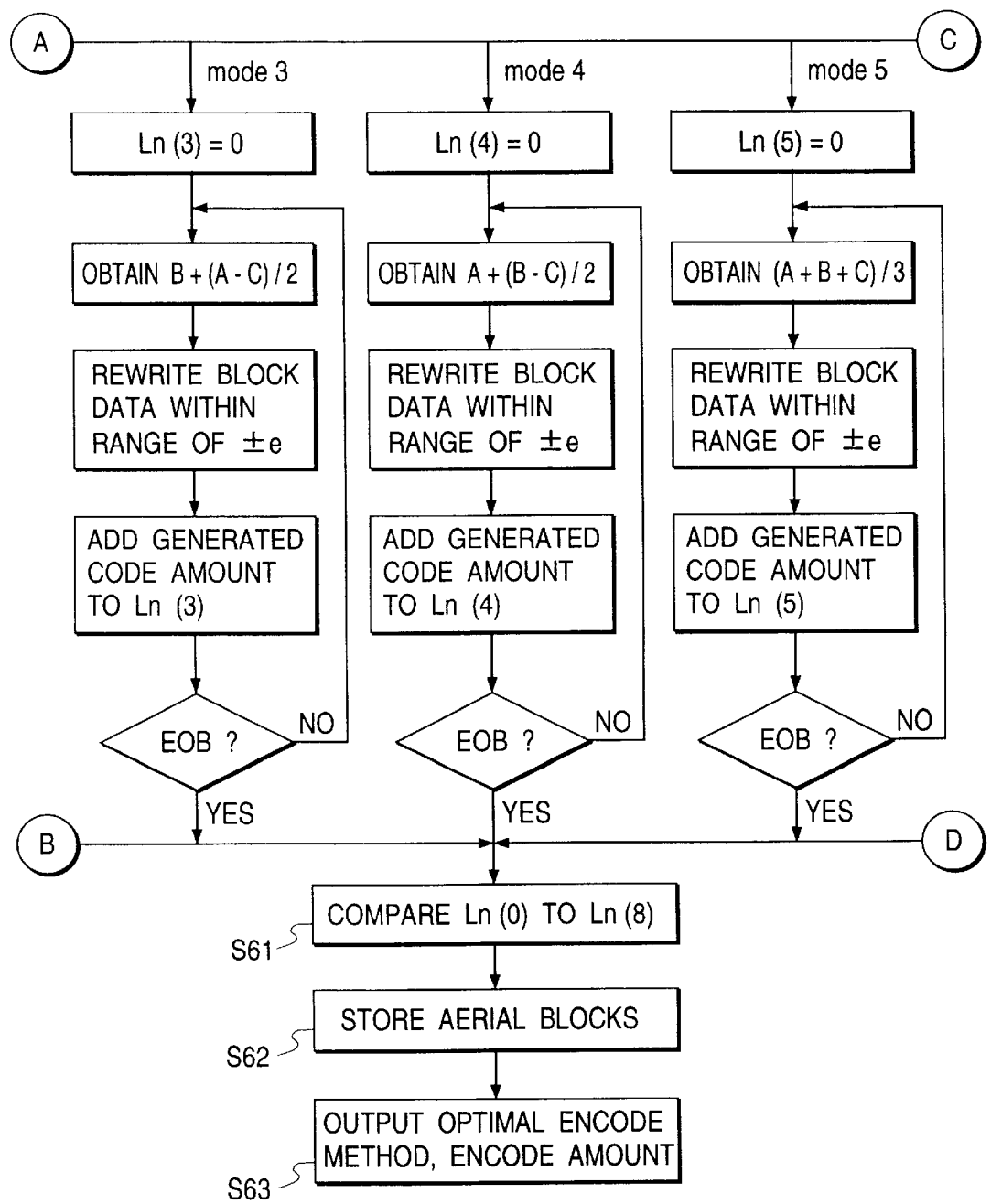
Figure 8C:
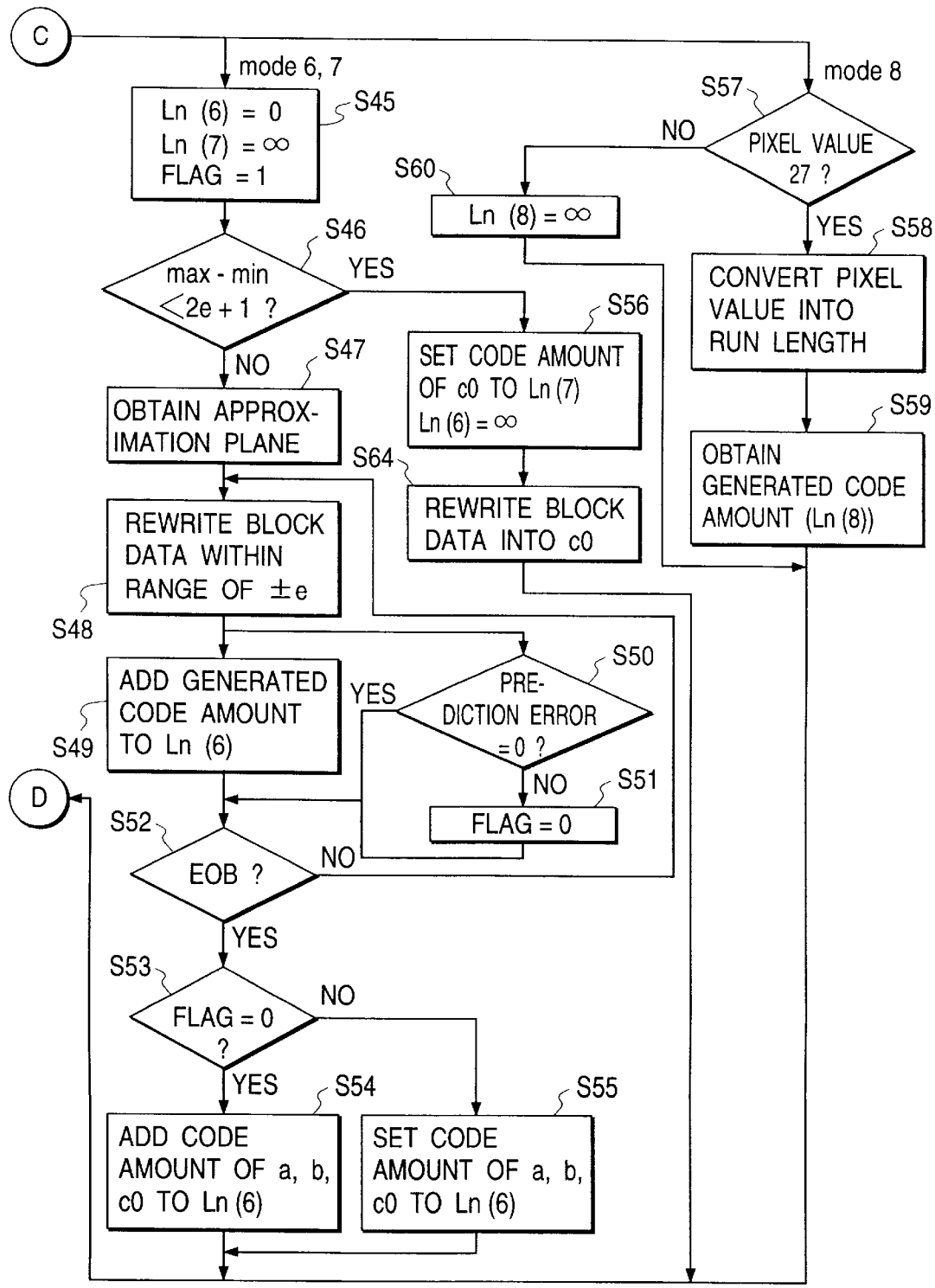

FIGS. 8A to 8C show a flow to select the optimal encoding method. The amounts of codes of all selectable encoding methods are estimated to conduct the selection of the optimal encoding method.

Prior to the estimation of the amounts of codes, the block data is updated to a form appropriate for each method. In FIG. 8A, S40 denotes a step to initialize the amount of codes Ln(0) generated by the encoding method #0, S41 denotes a step to determine a predicted value A+B−C, S42 denotes a step to update the pixel values in the block within the error range of ±e, S43 denotes a step to add one pixel of Huffman code length for the difference value to Ln(0), and S44 denotes a step to determine an end point of the block. When the amount of codes in encoding the block is generated, the process proceeds to S61.

The above precess is referred to mode 0 and mode 1 to mode 5 correspond to the processes for the encoding methods #1 to #5 which are identical to the above process.

S45 denotes a step to initialize the encoding methods #6 and #7. A flag (FLAG) indicating whether the approximate plane and the pixel values in the block completely match or not is prepared and it is initially set to 1 (complete match). The parameter Ln(6) indicating a code length for #6 is set to 0 and a parameter Ln(7) indicating a code length for #7 is set to a value which is not minimum of the Ln(0) to Ln(8). S46 denotes a step to determine whether the entire block is rendered to the same pixel value or not by changing the pixel values in the block within the error range ±e, S47 denotes a step to determine the block approximate plane P(x, y)=ax+by+c0 of the #6 described above, S48 denotes a step for each pixel to update the pixel value within the error range ±e to generate a pixel value for forming the virtual block and S49 denotes a step to add the Huffman code length for the difference value between the generated pixel value and the approximate plane P(x, y) to the Ln(6). S50 denotes a step to determine whether the difference value (prediction error) is 0 or not. When there is even one pixel value which is different from that of the approximate plane, the FLAG is set to 0 in S51. In S52, the end point of the block is determined.

S53 denotes a step to determine the value of the FLAG. If FLAG=0, the amount of codes of the difference value for each pixel generated in S49 and the amount of codes parameters a, b and c0 (c0') indicating the approximate plane P(x, y) are added to produce Ln(6) (S54), and the process proceeds to S61.

If FLAG=1 (the approximate plane and the pixel values of the block completely match), only the information of the approximate plane need be encoded and the amount of codes of the parameters a, b, c0 (c0') are substituted by Ln(6) (S55), and the process proceeds to S61.

When the value of Ln(6) is determined, Ln(7) is set to a value which is not minimum of Ln(0) to Ln(8).

In S56, the amount of codes of c0 (c0') is set to the value of Ln(7) and Ln(6) is set to a value which is not minimum of Ln(0) to Ln(8). In S64, the block data is updated (to generate the virtual block) within the range of ±e such that all pixel values in the block are rendered to c0 and the process proceeds to S61.

S57 denotes a step to determine whether the block is represented by two pixel values or not. If it is represented by the two pixel values, the process proceeds to S58, otherwise Ln(8) is set to a value which is not minimum of Ln(0) to Ln(8), and the process proceeds to S61.

S58 denotes a step to convert the pixel values to a run length. The amount of codes Ln(8) generated when the run length is encoded is determined and the process proceeds to S61.

S61 denotes a step to compare the values of Ln(0) to Ln(8) to select a minimum value and the corresponding optimal encoding method. S62 denotes a step to store the virtual block corresponding to the encoding method selected in S61 of the virtual blocks generated by updating the pixel values within the range of ±e in the respective modes (mode 0 to mode 8), and S63 denotes a step to output the optimal encoding method and the amount of codes.

The process before the step S61 determines the amounts of codes for the respective methods. This process is conducted after the block to be processed (or the sub-block) is copied in the separate memory area. Accordingly, the updating of the block data when the optimal encoding method is selected does not affect to the original block to be processed.

The steps S40 to S44 are now explained in detail. The steps S40 to S44 determine the amount of codes Ln(0) generated by the #0.

S41 to S44 denote a loop to raster-process the pixels in the block sequentially from the left upper and the processed pixels (the pixels updated in S42) are substituted by the original pixel value as the reference pixels of the pixels under consideration. When the reference pixels, (A, B, C) are out of the area of the 16×16 pixel block read in S2, the pixel values of the block data updated in S6 before the loop precess (S2 to S7) of the previous maximum block is used.

In the step S40, Ln(0) is set to 0. In the step S41, the predicted value P=A+B−C is generated based on the pixel value X under consideration and the surrounding pixel values A, B and C and the difference value D=X−P is calculated. In the step S42, a corrected difference value D' is determined by a formula (1) and the pixel under consideration is updated to D'+P. In the formula (1), $\downarrow x \downarrow$ represents omission of digits after the decimal point.

$$D' = \downarrow (D+\alpha)/(2e+1) \downarrow x(2e+1) \qquad (1)$$

$$\alpha = (D/|D|) x e \qquad (2)$$

Figure 11:
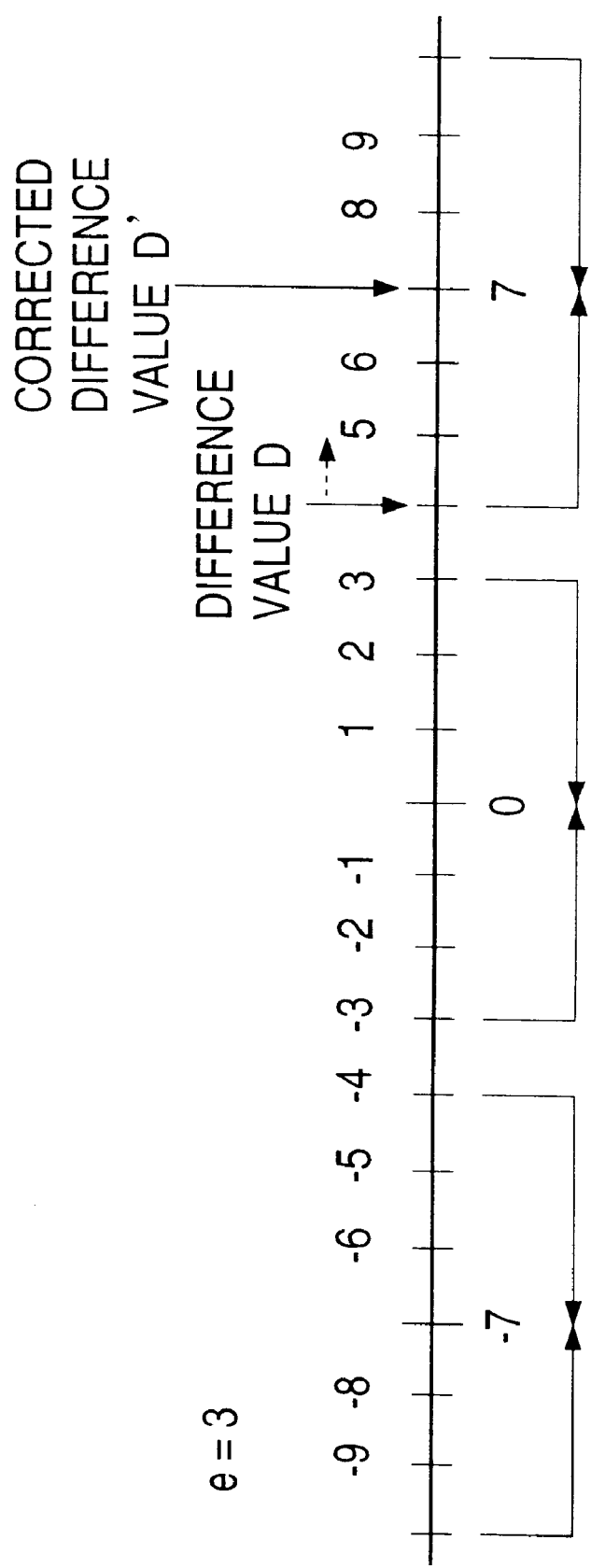
FIG. 11 shows a flow of an S10 encoding process.

FIG. 11 illustrates a corrected difference value D' when e=3 and the difference value D=4. As shown in FIG. 11, since the number of the difference values D' (−7, 0, 7) is smaller than the number of difference values D(−10 to 10), the information indicating the difference values is significantly reduced. Further, the possibility of the complete matching of the difference values and the predicted values is high.

In the present embodiment, the pixel value to be corrected (the corrected pixel value) X'=X+3. In the step S43, the difference between the updated corrected pixel value X' and the predicted value P, that is, the corrected difference value D' is Huffman-coded by the Huffman table for the size of the block to be processed (or the sub-block) and the generated code length is added to Ln(0). In the step S44, whether the process has been completed to the end point of the block or not is determined, and if it is completed, the process proceeds to a step S61, and if it is not completed, the next pixel is considered and the process starting from the step S41 is repeated. In this manner, the amount of codes Ln(0) generated when the encoding method #0 is used is determined. For the encoding methods #1 to #5, only the prediction methods are different and the methods for determining the amount of generated codes Ln(1 to 5) are same as that for the #0 and the detailed description thereof is omitted.

The steps S45 to S56 and S64 are now explained in detail. S45 denotes a step to initialize the variables for the #6 and #7. The amount of codes Ln(6) generated by the #6 is set to 0 and the amount of codes Ln(7) generated by the #7 is set to a sufficiently large value. A variable FLAG which is used to determine whether all difference values are 0 or not in the #6 is set to 1. In a step S46, a maximum value (max) and a minimum value (min) of the pixel values in the block are determined, and if max-min is smaller than 2e+1, the process branches to a process for the encoding method for the #7 (steps S56 et seq), otherwise the process proceeds to a process for the encoding method #6 (steps S47 et seq).

In a step S47, an approximate plane is determined from the pixel values in the block. The steps S48 to S52 sequentially process the pixel values in the block. In a step S48, the difference value D=X−P is determined from the pixel values X under consideration in the block and the value P corresponding to the position of the pixel under consideration on the approximate plane determined in the step S47, the corrected difference value D' is calculated in the same manner as that in the step S42 and the pixel under consideration is updated to D'+P. In a step S49, the difference value between the updated corrected pixel value X' and the predicted value P is Huffman-encoded by the Huffman table for the plane encoding and the code length thereof is added to Ln(6).

In a step S50, whether the difference value between the corrected pixel value X' and the predicted value P is 0 or not, and if it is not 0, the FLAG is set to 0 in a step S51. In a step S52, the end point of the block is determined, and if it is not the end point, the process starting from the step S48 is continued for the next pixel in the block. S53 denotes a step to determine the value of the FLAG. If it is 0, the process proceeds to S54, otherwise the process proceeds to S55. In the step S54, the amount of codes of a, b and c0 plus one bit for the FLAG is added to the Ln(6). In the step S55, the amount of codes of a, b and c0 plus one bit for the FLAG is substituted by a new Ln(6).

If it is determined that the encoding method #7 is available in the step S46, a quotient of (max−min)/2 is set to c0 in a step S56 and the amount of codes when c0 is encoded is substituted for the Ln(7) and a sufficiently large value is set to the Ln(6).

In a step S64, all pixel values in the block are updated. By this process, the amounts of codes Ln(6) and Ln(7) when the encoding methods #6 and #7 are used are determined.

The steps S57 to S60 are now explained in detail. S57 denotes a step to determine whether the encoding method #8 is available or not. The pixel values in the block are examined and if two pixel values appear, the process proceeds to S58; otherwise the process proceeds to S60.

In S60, a sufficiently large value is set to the Ln(8). In a step S58, the block is scanned in the order shown in FIG. 5 while a higher brilliance value of the two pixel values of the block is set to white and a lower brilliance value is set to black to convert it to white-and-black run length data. In a step S59, the amount of codes to represent the two appearing pixel values and the amount of codes when the run length data is Huffman-encoded by using the Huffman table exclusively prepared for the #8 are added to determine the amount of generated codes Ln(8) for the #8.

In this manner, the amounts of generated codes Ln(0) to Ln(8) for the encoding methods #0 to #8 are determined, and in a step S61, a minimum amount of codes which is the minimum of the above is determined and a sum of the minimum amount of codes and amount of codes indicating the encoding method is stored as the amount of code I of the block (one of the four amounts of codes comprising the amount of code LA or the total amount of code LB in FIG. 7, or the amount of code L) and the information representing the encoding method number (i) is also stored.

In a step S62, the virtual block generated in using the encoding method #i is stored. The virtual block is used to determine the block to be encoded (update the original image values) in the steps S28 and S34, and it is finally used to update the block data in the step S6.

In a step S63, the number i and the amount of codes I are outputted and the optimal encoding method selection process (corresponding to S21, S25 and S32 of FIG. 7) is terminated. The description of the selection of the optimal encoding method in the steps S21, S25 and S32 is thus completed.

In this manner, the block division information and the optimal encoding method in the step S3 have been determined.

Figure 5:
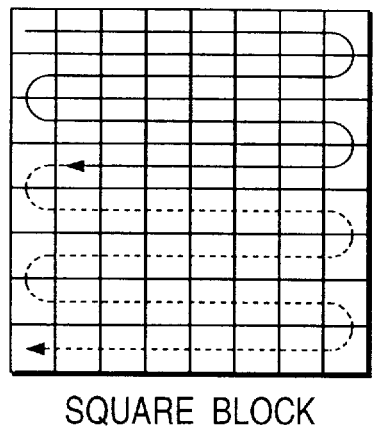
FIG. 5 shows a method for scanning run length in a #8 encoding method.
Figure 9:
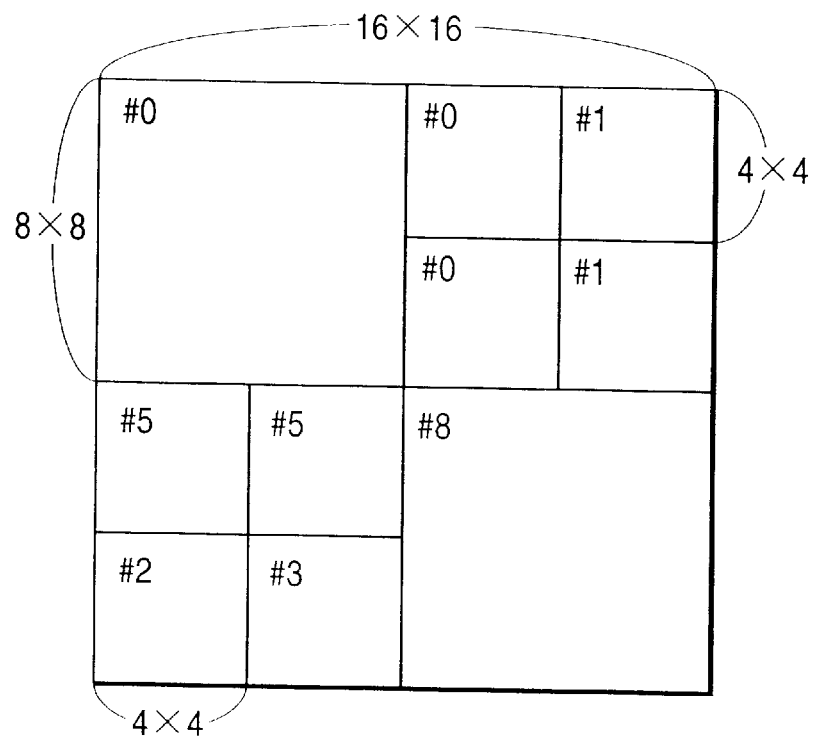
FIG. 9 shows a maximum block division method and encoded data format.
Figure 10:
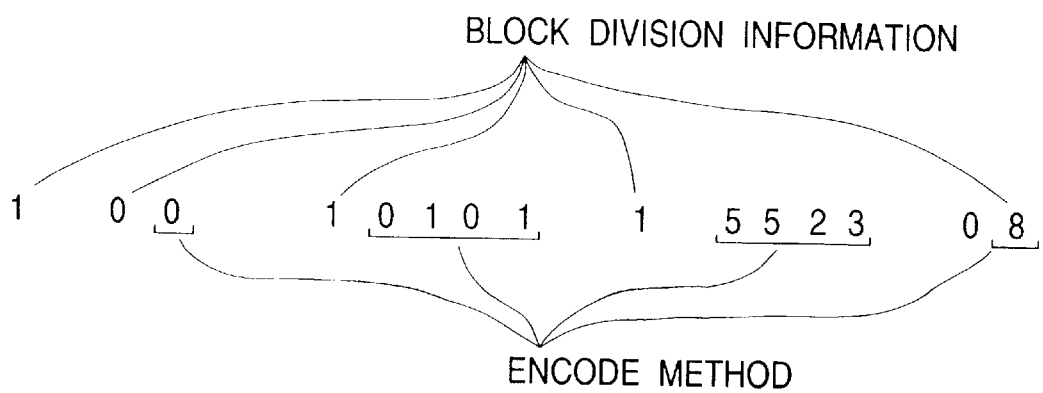
FIG. 10 shows a manner of converting a difference value to a corrected difference value.

FIG. 9 shows an example of the encoding method for each of the divided blocks to be encoded. The reference information based on FIG. 5 is shown in FIG. 10. This completes the detailed description of the step S3.

In a step S4, the reference information generated in S3 is stored in the memory.

In a step S5, for the encoding method number i selected for each of the blocks to be encoded, the numbers of times of occurrence of the encoding methods #0 to #8 are counted by encoding number counters provided one for each block size, and if it is one of #0 to #6, the number of times of occurrence of the corrected difference value D' when encoded by that method is added to the counter corresponding to the encoding method (the prediction encoding counter for #0 to #5, and the plane encoding counter for #6).

In a step S6, the pixel values of the block read in the step S2 are updated by using the data of the block to be encoded which were updated in the virtual block in the step S3 (based on S28 and S34).

In a step S7, the end point of the image is determined, and if it is not the end point of the image, the process staring from the step S2 is conducted to the next block, and if it is the end point, the process proceeds to a step S8.

The loop precess of S2 to S7 is the process to update the block data (virtual block) for each block to generate the image data. When the reference pixels (A, B, C or c0) used in the selection process of the encoding method in the step S3 are out of the area of the 16×16 pixel block read in the step S2, the pixel values of the block data updated in the step S6 before the previous loop precess are used.

In a step S8, based on the values of the 16×16 pixel prediction encoding counter, the 8×8 pixel prediction encoding counter, the 4×4 pixel prediction encoding counter and the plane prediction counter, the 16×16 pixel prediction encoding Huffman table, the 8×8 pixels prediction encoding Huffman table, the 4×4 pixel prediction encoding Huffman table and the plane encoding Huffman table are reconstructed. Further, the numbers of times of occurrence of the optimal encoding methods #0 to #8 are counted by the encoding method number counters provided for the respective block sizes, and the Huffman table for encoding the encoding method numbers are reconstructed in accordance with the statistics of the counts.

In a step S9, the end of the optimization processing loop (S0 to S8) is determined, and when a predetermined number of loops is completed, the process proceeds to the step S9, otherwise the process proceeds to the step S0. In this case, the S0 in the initial optimization processing loop and the step S0 in the second and subsequent optimization steps are different. In the S0 of the second and subsequent loops, the optimal Huffman table prepared in the previous step S8 is substituted for the reference Huffman table.

Figure 12:
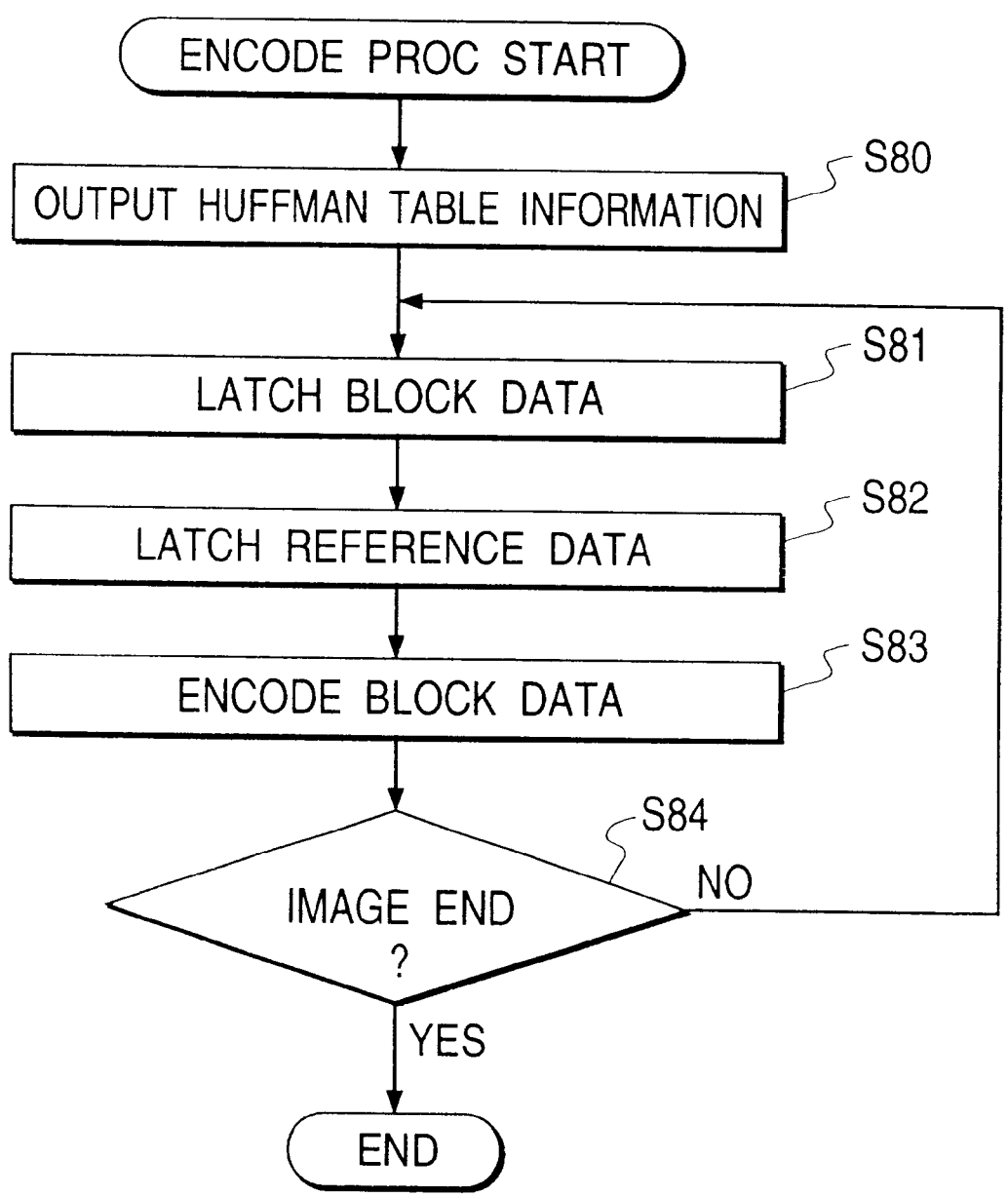
FIG. 12 shows a circuit configuration to implement the present invention.

In a step S10, the image data updated in the step S6 is actually encoded by referring the stored reference information. FIG. 12 shows a flow of the encoding process in the step S10. In FIG. 12, S80 denotes a step to encode the Huffman table, S81 denotes a step to read block data of the maximum size (16×16 pixels) from the image, S82 denotes a step to read the reference data corresponding to the block data, S83 denotes a step to encode the block data in accordance with the reference information and S84 denotes a step to determine the end point of the block. Detailed description follows.

In the step S80, for the 16×16 pixel encoding number Huffman table, the 8×8 pixel encoding number Huffman table, the 4×4 encoding number Huffman table, the 16×16 pixel prediction encoding Huffman table, the 8×8 prediction encoding Huffman table, the 4×4 prediction encoding Huffman table and the plane encoding Huffman table, the information indicating the structures of the respective Huffman tables is outputted as the Huffman table information.

In the step S81, the block data are sequentially read with the maximum block size from the image data. In the step S82, the reference information for the block data is read from the memory.

In the step S83, the reference information and the data derived by encoding the block data of the maximum block size in accordance with the reference information are outputted as the encoded data sequence.

In the step S84, the end point of the image is determined, and if an unprocessed block is present, the process starting from the step S81 is conducted for the next block.

In this manner, the encoded data sequence for the image data is generated and outputted.

This completes the description of the first embodiment.

[Modification of First Embodiment]

The present invention is not limited to the above embodiment. For example, while the block is divided with the maximum block size of 16×16 pixels in the above embodiment, the block size may be set to 128×128 or larger pixel.

Further, while the block is divided into four same size sub-blocks in the above embodiment, the block size may be variable.

In the first embodiment, the block is divided based on the amount of codes of the block to be processed and the amounts of codes of the sub-blocks derived by dividing the block to determine the block to be encoded. Alternatively, the amount of codes of all blocks from the maximum block (16×16 pixels) to the minimum block (4×4 block) may be determined and then the block may be divided based on the amount of all codes.

Figure 6:
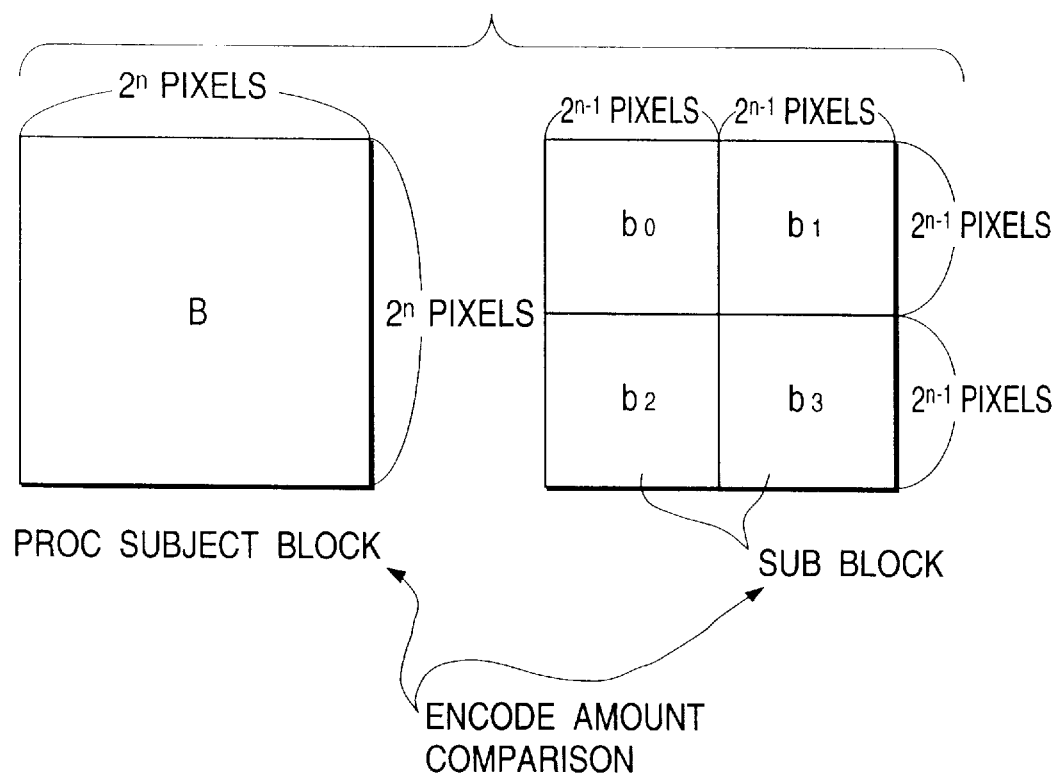
FIG. 6 show a manner of dividing a block to be processed into sub-blocks.

Further, the amount of codes of the minimum block may be first determined, this block is regarded as the sub-block, a temporary block division method and the amount of codes are determined based on the total amount of codes of the four sub-blocks (4×4 pixels) as shown in FIG. 6 and the amount of codes of the block (8×8 pixels) of the combined area, a new temporary block division method is determined based on the total amount of codes of the four determined areas (8×8 pixels) and the amount of codes of a larger block (16×16 pixels) comprising the determined area (8×8 pixels), and it is repeated until the maximum block size is reached to determine the block to be encoded.

Further, while the prediction encoding method, the plane encoding method and the run length encoding method are used as the selectable block encoding method in the above embodiment, the application method may be changed by changing the prediction method or other encoding method such as the Marcof model encoding method may be used. While the Huffman encoding is uses as the entropy encoding method in the above embodiment, other entropy encoding method such as arithmetic encoding method may be used.

In S6, the block data need not be updated but the value of the prediction error (generated in S3) when the image by the updated block data is encoded may be stored. In this case, in S10, instead of reencoding by using the updated block data, the encoding may be made by using the prediction error (corrected difference value) determined in the step S3. However, when the difference values for the respective pixels are stored, the circuit configuration and the process to generate the reference pixel values are complex compared to the process in which the prediction encoding is conducted by referring the pixel values (A, B and C) in S41 of FIG. 8A. Accordingly, in the first embodiment, the method of storing the corrected pixel value is used rather than the method for storing the corrected difference value.

Figure 13:
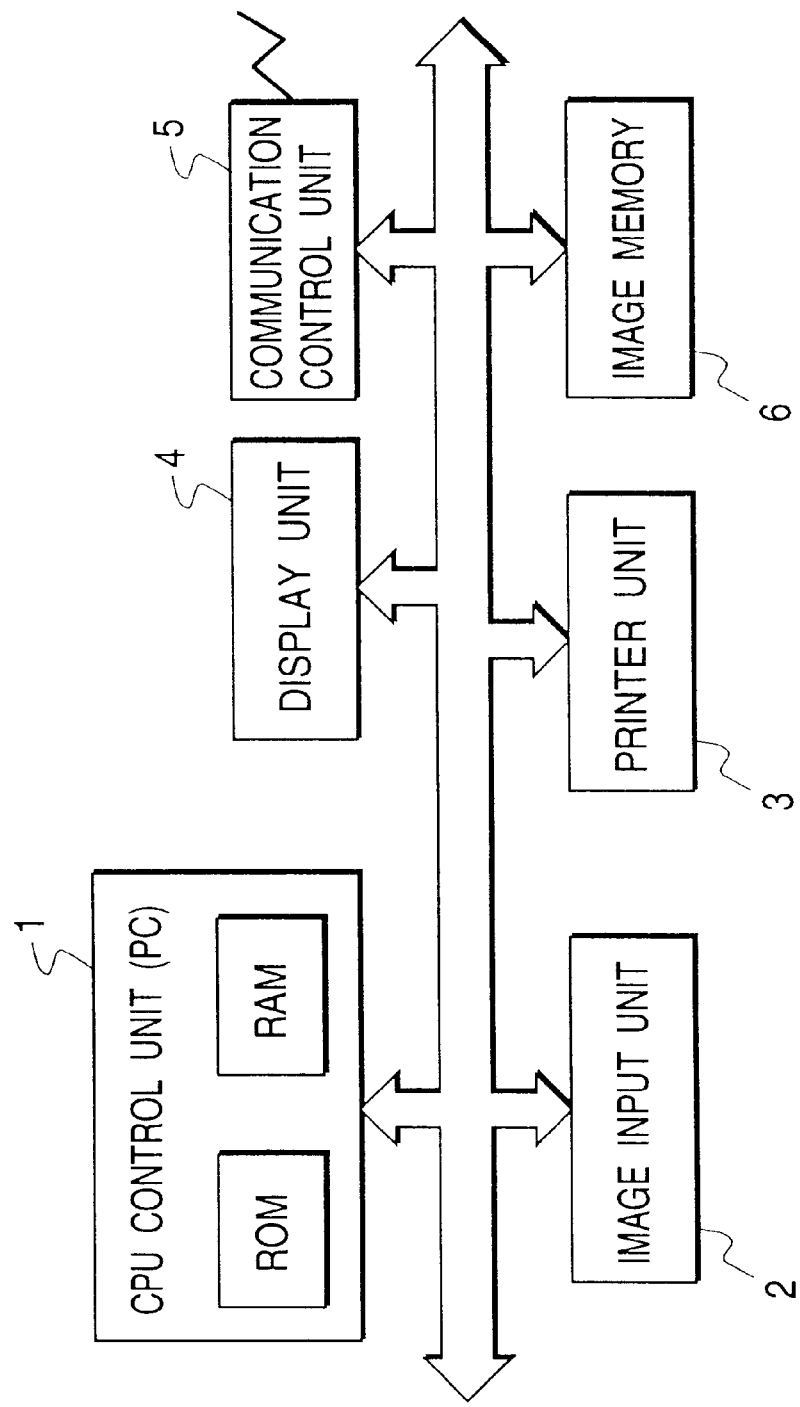
FIG. 13 shows a circuit configuration to implement the first form of implementation.

FIG. 13 shows an example of the apparatus for conducting the encoding process of the first embodiment. Numeral 1 denotes a CPU control unit which can conduct the encoding and decoding of the image data by the software processing, numeral 2 denotes an image input unit for reading the image data, numeral 3 denotes a printer unit for printing the image data, numeral 5 denotes a communication control unit for transmitting the data encoded by the CPU control unit 1 or the encoded data transmitted from an external equipment and numeral 6 denotes an image memory for storing the image information.

Second Embodiment

Figure 14:
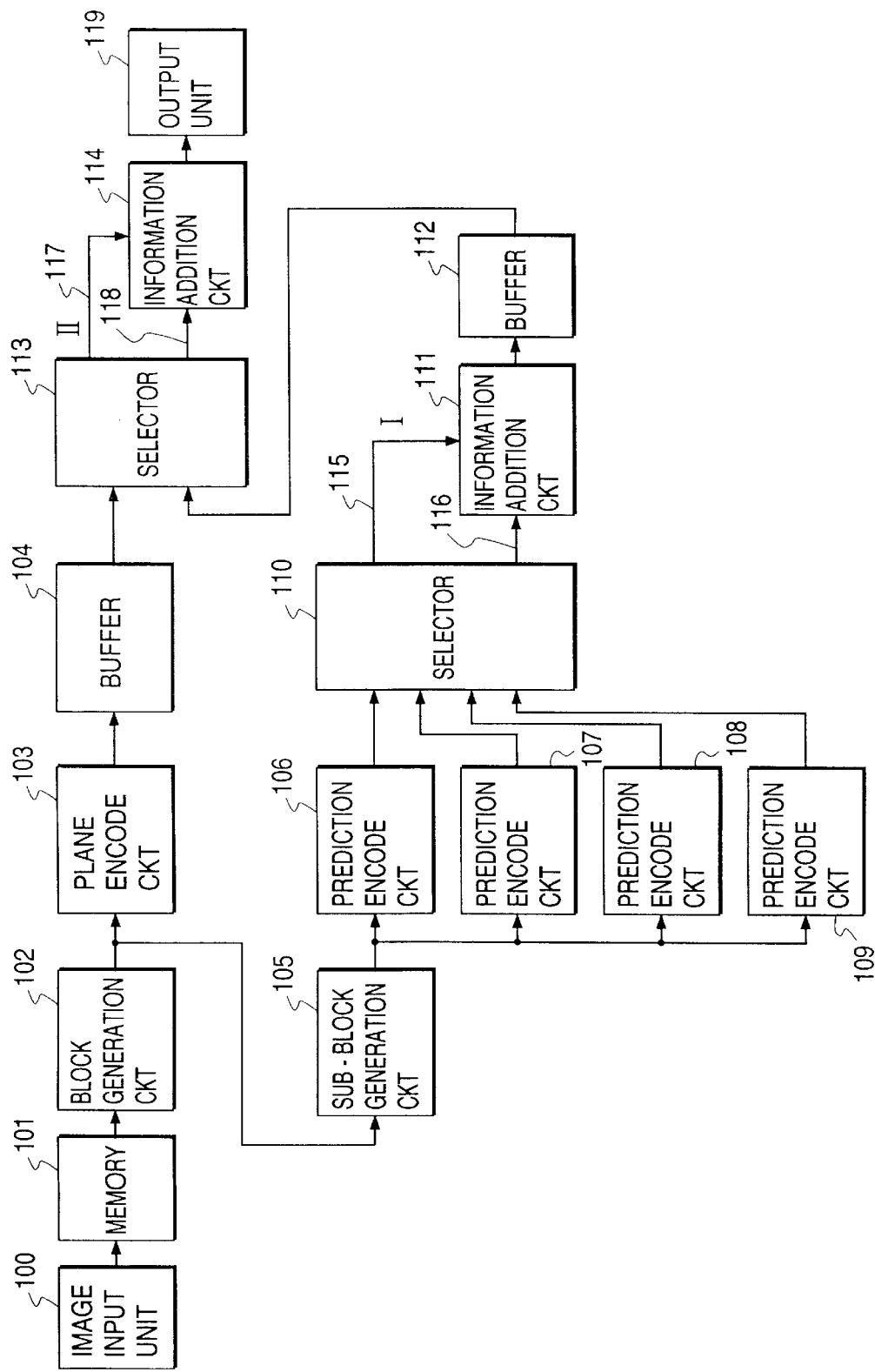
FIG. 14 shows a block diagram of an encoding apparatus of a first embodiment of the present invention.

FIG. 14 shows a block diagram of a second embodiment of the present invention. In FIG. 14 numeral 100 denotes an image input unit for generating image data such as an image reader, a TV camera or a host computer, numeral 101 denotes a block generation circuit for blocking image data for each pixel, numeral 103 denotes a plane encoding circuit, numeral 104 denotes a buffer for adjusting timing, numeral 105 denotes a sub-block generation circuit for dividing the block in the block generation circuit into sub-blocks, numerals 106, 107, 108 and 109 denote prediction encoding circuit for conducting the prediction encoding in different methods, numeral 110 denotes a selector, numeral 111 denotes an information addition circuit, numeral 112 denotes a buffer for adjusting the timing, numeral 113 denotes a selector, numeral 114 denotes an information addition circuit, numerals 115, 116, 117 and 118 denote signal lines and numeral 119 denotes an output unit for outputting the encoded data to an external memory and an external equipment.

Figure 15:
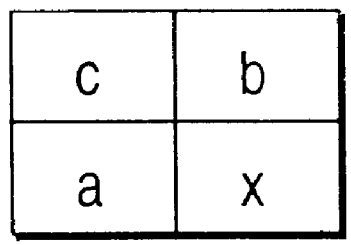
FIG. 15 shows position of surrounding pixels a, b and c for a pixel under consideration.
Figure 16:
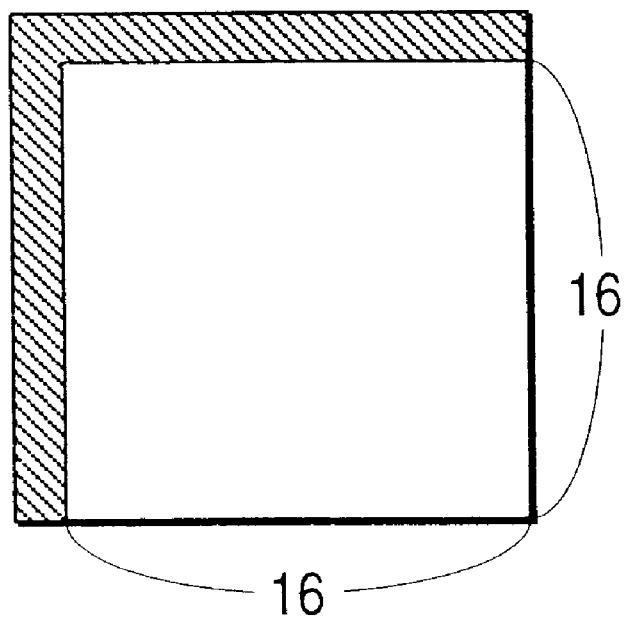
FIG. 16 illustrates block generation.

FIG. 15 shows positions of surrounding pixels a, b and c used by the prediction encoding circuits 106, 107, 108 and 109. In FIG. 15, x represents a pixel under consideration and a, b and c are defined by the relative positions to x.

First, the image data to be encoded is stored in the memory 101 from the image input unit 100. The block generation circuit 102 sequentially reads the image data by 16×16 pixel block and stores them. As shown in FIG. 3, the data of the left and upper pixels of the 16×16 pixel block are also read as shown in FIG. 3 and they are stored. The plane encoding circuit 103 calculates a plane $\alpha x+\beta y+\gamma$ (x, y=0, . . . , 15) which proximates the 16×16 pixel block stored in the block generation circuit 102 and Huffman-encodes the values of the parameters $\alpha$, $\beta$ and $\gamma$ and the difference value between the proximate plane and the pixels values in the block and stores them in the buffer 104. Detail of the plane encoding circuit 103 will be described later.

On the other hand, the sub-block generation circuit 105 sequentially reads the 8×8 pixel blocks from the 16×16 pixel block stored in the block generation circuit 102 and stores them. The data of the left and upper pixels of the 8×8 pixel block are also read and stored. The prediction encoding circuit 106 calculates x−a for each pixel in the 8×8 pixel sub-block stored in the sub-block generation circuit 105 and Huffman-encodes it. Similarly, the prediction encoding circuit 107 Huffman-encodes x−b, the prediction encoding circuit 108 Huffman-encodes x−c and the prediction encoding circuit 109 Huffman-encodes x−a−b+c. The selector 110 selects the encoded data of the smallest amount of codes of the encoded data outputted from the prediction encoding circuits 106, 107, 108 and 109, outputs the code sequence thereof to the signal line 116 and outputs 2-bit identification data I to the signal line 115 to identify the selected prediction encoding circuit. The information addition circuit 111 adds the identification data I from the signal line 115 to the head of the code sequence of the signal line 116 and stores them in the buffer 112. This process is conducted for the four pixel sub-blocks so that one block of codes of the 16×16 pixels are stored in the buffer 112.

The selector 113 compares the amount of codes of the buffer 104 and the buffer 112, selects the smaller one and outputs it to the signal line 118. It also outputs one-bit identification data II for identifying the selected buffer 104 or 112 to the signal line 117. The information addition circuit 114 adds the identification data II from the signal line 117 to the head of the code sequence and outputs them to the output unit 119.

The above process is repeated until the last block stored in the memory 101 is reached to generate the code.

Figure 17:
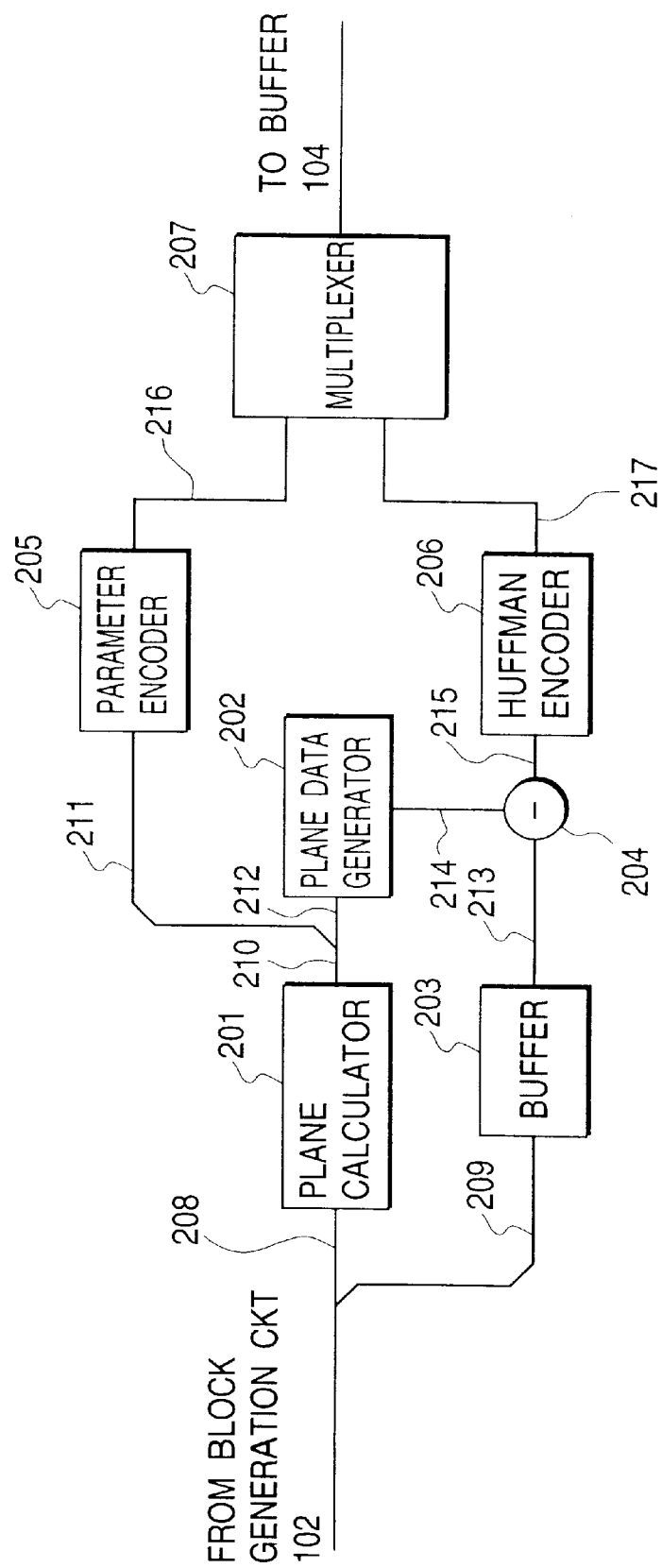
FIG. 17 shows a block diagram of a plane encoding circuit.

FIG. 17 shows a configuration of the plane encoding circuit 103.

In FIG. 17, numeral 201 denotes a plane calculation circuit, numeral 202 denotes a plane data generation circuit, numeral 203 denotes a buffer, numeral 204 denotes a differentiation circuit, numeral 205 denotes a parameter encoding circuit, numeral 206 denotes a Huffman encoding circuit and numeral 207 denotes a multiplexor.

In the present embodiment, the image data to be encoded is an 8-bit/pixel tonality image.

The encoding is conducted block by block. The 16×16 pixel block data from the block generation circuit 201 is sent to the plane calculation circuit 201 and the buffer 203 through the signal lines 208 and 209.

The plane calculation circuit 201 calculates the parameters a, b, cθ and m defining the plane in a manner to be described later and sends them to the plane generation circuit 202 and the parameter encoding circuit 205 through 210, 211 and 212. The plane generation circuit 202 generates the plane data in accordance with the received parameters and outputs it to 214. A difference between it and the input block image data from 213 is calculated for each pixel in the block by the differentiation circuit 204 and the plane prediction error value is sent to the Huffman encoding circuit 206 for each pixel. The Huffman encoding circuit 206 allocates the Huffman code in accordance with the built-in Huffman table and outputs the code data to 217.

On the other hand, the parameter inputted to the parameter encoding circuit 205 from the signal line 211 is encoded by an appropriate number of bits and it is sent to the multiplexor 207 from 216. The multiplexor 207 rearrange the parameter code sent from 216 and the difference code sent from 217 in a predetermined sequence to generate a series of bit stream which is outputted to the buffer 104.

An operation of the plane calculation circuit 201 is now explained. It is assumed that the pixel value of the left upper pixel of the input N×N (N=16 in the present embodiment) pixels is c$\theta$. When the pixel value in the pixel coordinate (x, y) in the block is d×y, the following statistics is taken.

$$A = \sum_{j}^{N-1}\sum_{i}^{N-1} i^2 = \sum_{j}^{N-1}\sum_{i}^{N-1} j^2$$

$$B = \sum_{j}^{N-1}\sum_{i}^{N-1} 2ij$$

$$C = \sum_{j}^{N-1}\sum_{i}^{N-1} 2(C\theta - d_{ij})i$$

$$D = \sum_{j}^{N-1}\sum_{i}^{N-1} 2(C\theta - d_{ij})j$$

By using those formulas, a=(BD−2AC)/(4A$^2$−B$^2$)
b=(BC−2AD)/(4A$^2$−B$^2$)

are calculated and an integer m=min($\lceil$max($|a|$, $|b|$)$\rceil$, 16) is determined, where $|\ |$ indicates an absolute value and $\lceil\ \rceil$ indicates round-up, max( ) indicates a larger one and min( ) indicates a smaller one. Thus, m assumes 1 to 16. Further, a and b are normalized and quantized by using m.

a=$\lfloor$(a/m+1)128$\rfloor$
b=$\lfloor$(b/m+1)128$\rfloor$ where $\lfloor\ \rfloor$ indicates omission.
Thus, a and b are quantized to values of 0 to 255.

When the initially calculated m is 16, a and/or b can assume a value smaller than 0 or larger than 255 and hence it is clipped to keep the range of 0 to 255. After a and b are rendered to 8-bit values, 1 is subtracted from m so that m is rendered to a 4-bit value of 0 to 15.

The result from the above operation is a parameter which defines a best fit plane based on a minimum square error when the plane passing through the left upper pixel of the block is given by Z=ax+by+C$\theta$ and the position of the left top pixel is (0, 0, C$\theta$).

When all parameters have been calculated, the plane calculator 201 outputs 8-bit values for a, b and C$\theta$ and a 4-bit value for m.

An operation of the plane generation circuit 202 is now explained.

The plane generation unit 202 receives the plane parameters a, b, C$\theta$ and m explained above from 106 to generate the prediction block. Namely, a' and b' are calculated by a'=(m+1)(a−128)256
b'=(m+1)(b−128)256 and the pixel value d$_{ij}$ of the coordinate (i, j) (where i and j are integers between 0 and N−1) is generated by d$_{ij}$=$\lfloor$(C$\theta$+a' i+b' j+0.5)$\rfloor$ The block data generated in this manner is outputted to 214.

While all pixels in the block are encoded in the above embodiment, (1) the block may be divided into sub-blocks and the code indicating whether it is the sub-block to be encoded or not may be added for each sub-block, or (2) a plane corresponding to one-bit block may be provided to determine whether it is the sub-block to be encoded or not. The method briefly described in this supplement is particularly effective to a relatively complex portion in the image.

In accordance with the plane encoding described above, the prediction method which does least cause the reduction of the encoding efficiency is attained for the simple brilliance gradient portion bearing noise which occupies a large portion of the actual image, and the encoding efficiency to the entire image is significantly improved over the prior art.

[Modification of Second Embodiment]

The present invention is not limited to the above embodiment. For example, while four values a, b, c and a+b−c are recited as the prediction values used in the prediction encoding in the above embodiment, any other combination which is constructed from the referable pixels may be used. While the Huffman encoding is used together with the plane encoding and the prediction encoding in the above embodiment, other entropy encoding system such as the arithmetic encoding may be used. The plane encoding is not limited to the embodiment in which $\alpha$, $\beta$ and $\gamma$ of the proximate plane ax+py+y are encoded as the plane defining information but any values which can specify the plane may be used. Alternatively, instead of the plane, a relatively simple curved surface may be used.

The image encoding apparatus of the second embodiment comprises block division means for dividing the image data into blocks, plane encoding means for determining the proximate plane for each divided block and encoding the information specifying the proximate plane and the difference value between the proximate plane and the block, means for sub-dividing the block into sub-blocks, prediction encoding means for selecting the optimal prediction system for each sub-block and encoding the information specifying the selected prediction system and the error by the selected prediction system, means for selecting one of the plane encoding means and the prediction encoding means for each block and means for adding the information for specifying the selected encoding system. Accordingly, the plane encoding for the block having the planar nature and the prediction encoding for each sub-block for other block may be selectively used. Thus, the amount of generated codes can be suppressed.

By making the block size of the plane encoding to be larger than the block size of the prediction encoding, the efficient encoding is attained by utilizing the characteristic of the plane encoding.

By extracting the information specifying the proximate plane as the coefficients of the operation formula, the efficiency of the encoding by block by block is enhanced.

In accordance with the present invention, by converting the pixel values in the image or the block, the image data can be encoded with a relatively high efficiency while controlling the error of the pixel values by using the relatively simple circuit configuration and process.

Further, the multi-value data can be encoded at the high efficiency while controlling the error of the pixel values.

Further, in accordance with the present invention, since the image data to be encoded is updated prior to the encoding within the range of +e, the encoding unit can confirm the decoded image. In this case, if it is after S6, the updated image data may be read and monitored on the display to confirm the decoded image.

In accordance with the present invention, the image is divided into blocks, the formula of the proximate plane which proximate the block is calculated for each block and the error from the proximate plane is encoded. Thus, when the original image free from the actual noise is sufficiently proximated by the plane, the dispersion of the noise bearing on the prediction value can be suppressed to the same degree as that of the noise originally included in the original image and the reduction of the encoding efficiency is prevented.

In accordance with the present invention, the encoding by using the proximate plane for each block and the encoding by the prediction method selected from the plurality of prediction methods are provided so that the high efficiency encoding is attained even when the multi-value data is reversibly encoded.

The present invention may be modified without departing from the scope of the claims.

What is claimed is:

1. An image processing apparatus comprising:
    division means for dividing an image into blocks of pixels to be encoded;
    generation means for generating parameters defining a plane based on values of first blocks of pixels and values indicating positions of the blocks of pixels to be encoded;
    plane encoding means for encoding difference values between the values of the blocks of pixels indicated by the plane defined by the parameters and the values of the encoded blocks of pixels; and
    output means for outputting the encoded difference values obtained by said plane encoding means and the parameters, as final encoded data.

2. An image processing apparatus according to claim 1, wherein said plane is a three-dimensional plane.

3. An image processing apparatus according to claim 1, wherein said plane is a proximate plane based on the values of the encoded pixels.

4. An image processing apparatus according to claim 1, wherein the parameters are coefficients of a function representing the plane.

5. An image processing apparatus according to claim 3, wherein said plane is determined based on statistics derived by calculating the values of the encoded block pixels.

6. An image processing apparatus according to claim 1, further comprising prediction encoding means different from said plane encoding means, wherein said plane encoding means and said prediction means are selectively used.

7. An image processing method comprising the steps of:
    dividing an image into blocks of pixels to be encoded;
    generating parameters defining a plane based on values of first blocks of pixels and values indicating positions of the blocks of pixels to be encoded;
    encoding difference values between the values of the blocks of pixels indicated by the plane defined by the parameters and the values of the encoded blocks of pixels; and
    outputting the encoded difference values, obtained in said encoding step and the parameters, as final encoded data.

8. An image processing method comprising:
    an input step of inputting original image data;
    a first encoding step of rewriting the input original image data within a range from $-e$ to $e$ of a change amount into first image data suitable for high compression rate encoding by a first encoding method and for encoding the first image data by the first encoding method to generate first encoded data;
    a second encoding step of rewriting the input original image data within the range from $-e$ to $e$ of the change amount into second image data suitable for high compression rate encoding by a second encoding method and for encoding the second image data by the second encoding method to generate second encoded data; and
    a selection step of selecting one of the first encoded data and the second encoded data by comparing an amount of the first encoded data and an amount of the second encoded data.

9. A method according to claim 8, further comprising a third encoding step of rewriting the input original image data within the range from $-e$ to $e$ of the change amount into third image data suitable for high compression rate encoding by a third encoding method and for encoding the third image data by the third encoding method to generate third encoded data.

10. A method according to claim 9, wherein said selection step selects one of the first, second and third encoded data by comparing an amount of the first encoded data, an amount of the second encoded data and an amount of the third encoded data.

11. A method according to claim 8, wherein the first and second encoding methods are prediction encoding methods which are different from each other.

12. A method according to claim 8, wherein ranges of an allowable change amount used respectively in said first encoding step and said second encoding step are the same.

13. An image processing apparatus comprising:
    input means for inputting original image data;
    first encoding means for rewriting the input original image data within a range from $-e$ to $e$ of a change amount into first image data suitable for high compression rate encoding by a first encoding method and for encoding the first image data by the first encoding method to generate first encoded data;
    second encoding means for rewriting the input original image data within the range from $-e$ to $e$ of the change amount into second image data suitable for high compression rate encoding by a second encoding method and for encoding the second image data by the second encoding method to generate second encoded data; and
    selection means for selecting one of the first encoded data and the second encoded data by comparing an amount of the first encoded data and an amount of the second encoded data.

14. An image processing method comprising:
    an input step of inputting a block image comprising a plurality of pixels;
    a calculation step of calculating a three dimensional plane function Z based on coordinates of each pixel of the block image and values of the plurality of pixels;
    a generation step of generating a difference between a pixel value represented by the three dimensional plane function Z and the values of the plurality of pixels; and
    an output step of outputting the three dimensional plane function Z and the generated difference as final encoded data.

15. A method according to claim 14, wherein the block image is formed by N×N pixels.

16. A method according to claim 14, wherein said generation step Huffman-encodes the difference.

17. A method according to claim 14, wherein the three dimensional plane function Z includes coordinates x and y of each pixel of the block image as parameters.

18. A method according to claim 17, wherein the three dimensional plane function Z is represented by Z=ax+by+c, where a, b and c are constants, respectively.

19. An image processing apparatus comprising:

input means for inputting a block image comprising a plurality of pixels;

calculation means for calculating a three dimensional plane function based on coordinates of each pixel of the block image and values of the plurality of pixels;

generation means for generating a difference between a pixel value represented by the three dimensional plane function and the values of the plurality of pixels; and output means for outputting the three dimensional plane function and the generated difference as final encoded data.

* * * * *

UNITED STATES PATENT AND TRADEMARK OFFICE
CERTIFICATE OF CORRECTION

PATENT NO. : 6,061,474
DATED : May 9, 2000
INVENTOR(S) : Hiroshi Kajiwara, et al.

It is certified that error appears in the above-identified patent and that said Letters Patent is hereby corrected as shown below:

Title page,
[73], Assignee: "CanonKabushiki Kaisha," should read -- Canon Kabushiki Kaisha --.

Column 5,
Line 42, "If" should read -- if --;
Line 57, "th e" should read -- the --; and
Line 58, "use d" should read -- used --.

Column 9,
Line 59, "pixels" should read -- pixel --.

Column 11,
Line 11, "uses" should read -- used --.

Column 13,
Line 12, "is" should read -- are --.

Column 14,
Line 22, "ax+py+y" should read -- $\alpha x+\beta y+y$ --; and
Line 60, "+e," should read -- $\pm e$, --.

Signed and Sealed this

Twenty-fifth Day of September, 2001

*Attest:*

NICHOLAS P. GODICI
*Attesting Officer*    Acting Director of the United States Patent and Trademark Office